United States Patent [19]

Humphrey

[11] 3,870,810

[45] Mar. 11, 1975

[54] INHIBITING BEER GUSHING

[75] Inventor: Anthony Martin Humphrey, Ickenham, Uxbridge, England

[73] Assignee: Bush Boake Allen Limited, London, England

[22] Filed: Mar. 9, 1973

[21] Appl. No.: 339,679

[30] Foreign Application Priority Data
Mar. 9, 1972  Great Britain................... 11077/72

[52] U.S. Cl................. 426/329, 426/223, 426/349, 426/429
[51] Int. Cl............................ C12h 1/12, C12c 9/02
[58] Field of Search......... 99/48, 50.5, 31; 426/223, 426/429, 329, 330, 349, 422

[56] References Cited
UNITED STATES PATENTS

| | | | |
|---|---|---|---|
| 3,193,387 | 7/1965 | Segel et al. ............................ | 99/48 |
| 3,364,265 | 1/1968 | Klingel et al...................... | 99/50.5 X |
| 3,615,660 | 10/1972 | Bavisotto et al................... | 99/31 X |

OTHER PUBLICATIONS

National Research Council, Chemicals Used In Food Processing, Publication 1274 National Academy of Sciences, Washington, D.C., 1965 (p. 21).

Amerine et al., The Technology of Wine making, 2nd ed., The Al. Publ. Co., Inc., Westport, Conn., 1967 (p. 742), TP548A48.

Sandegren et al., Biochemical aspects of Continuous Alcoholic Fermantation, Wallerstein Laboratories Communications, Vol. XXIV, No. 85, 1961, (pp. 269–277), TP500W17.

*Primary Examiner*—David M. Naff
*Attorney, Agent, or Firm*—Flynn & Frishauf

[57] ABSTRACT

The present invention provides a method for reducing the tendency of beer to gush by incorporating in the beer 1 to 20 percent based on the weight of iso-$\alpha$-acids in the finished beer of an unsaturated fatty acid having from 10 to 20 carbon atoms. The invention includes hop extracts containing said unsaturated fatty acid and also includes methods of making said extracts.

10 Claims, No Drawings

INHIBITING BEER GUSHING

The present invention relates to brewing and in particular to the inhibition of gushing which is an excessive and uncontrolled frothing occasionally observed in certain types of bottled beer when they are opened whose causes are not fully understood.

Gushing is not directly related to the normal foaming and head retention properties which are necessary characteristics of any acceptable beer. We have discovered that an important factor governing the tendency of beer to gush is the presence of absence of fatty acids in trace amounts. We have further discovered that saturated fatty acids have serious disadvantages in that they tend to precipitate out of beer at low temperatures when present in the concentrations required to suppress gushing. We have found that unsaturated fatty acids are more effective gushing inhibitors than saturated fatty acids and are sufficiently soluble to avoid many of the difficulties which can occur with saturated fatty acids in cold weather or in over-refrigerated beer. Finally we have found contrary to previous belief that certain highly pure unsaturated fatty acids can be obtained which permit suppression of gushing without affecting the odour or quality of the beer.

Our invention provides a method of reducing the tendency of beer to gush which comprise adding thereto an unsaturated fatty acid having from six to twenty five carbon atoms in proportion of from 1 percent to 20 percent based on the weight of iso-$\alpha$-acids in the beer.

The preferred acid is oleic acid. Other acids which may be employed include linoleic and linolenic acid, although these may be less readily available in a sufficiently pure state to prevent an adverse effect on the quality of the beer. The acid may have one or more (e.g. 2 or 3) ethylenic bonds one or more acetylenic bonds or both ethylenic and acetylenic bonds and may preferably have 10 to 20 carbon atoms.

The unsaturated acid is preferably added to beer in a proportion of from 5 to 15 percent based on the weight of iso-$\gamma$-acids present. The acids may be added at any stage of the brewing process before or after hopping before or after fermentation. Preferably the unsaturated acids are added as part of a hop extract which may typically be an isomerised extract and which may be added to beer after fermentation.

The invention therefore provides an isomerised hop extract comprising is-$\alpha$-acids or their salts and from 1 to 20 percent by weight of the iso-$\alpha$-acids of an unsaturated carboxylic acid having from 6 to 25 carbon atoms.

Preferably the iso-$\alpha$-acids are present as an aqueous alkaline solution of their alkali metal salts especially the potassium salt. Solutions of potassium salts may conveniently contain from 2 to 50 percent by weight iso-$\alpha$-acids preferably 10 to 40 percent. Alternatively the iso-$\alpha$-acids may be present as an aqueous suspension of a relatively water insoluble salt such as an alkaline earth salt (e.g. calcium or preferably magnesium) or a zinc salt.

Preferably the extract is substantially free from B-acids e.g. containing less than 10 percent of B-acids based on the weight of iso-$\alpha$-acids and prederably less than 5 percent most preferably less than 2 percent. Preferably the extract is also substantially free from xanthohumols (e.g. less than 10 percent based on iso-$\alpha$-acids preferably less than 5 percent most preferably less than 2 percent).

The unsaturated acids may be present in the extract as their salts and any reference herein to unsaturated acids is to be construed as including a reference to their salts especially the sodium or potassium salts.

In order to compare the effects of hop extracts with and without fatty acids on gushing a commercial hop extract was purified to remove any fatty acids naturally present.

A sample of commercial isomerised hop extract in the form of an aqueous solution of the potassium salts of iso-$\alpha$-acids (100g. containing 40 percent by wt. iso-$\alpha$-acids) was dissolved in water (500ml) and a layer of petroleum ether (SBP2. 75/95)(200ml) was added. Hydrochloric acid (2N) was added with shaking until the aqueous layer was distinctly acid (i.e. pH 1.). The upper petrol layer containing the iso-$\alpha$-acids was separated and extracted with successive portions of 3 percent aqueous potassium bicarbonate. (3 × 200 ml). The combined aqueous portions were backwashed with a little fresh petroleum ether and the separated aqueous phase extracted with successive portions of methyl iso butyl ketone (3 × 150 ml). The organic layers were separated combined and evaporated with the addition of water to yield an aqueous solution of isomerized hop extract. Yield 60g. 32 percent iso a. This procedure substantially eliminated any natural fatty acids which may have been present in the extract.

A portion (20g.) of this purified extract was mixed with potassium oleate (0.6g) and warmed to effect dissolution. The purified extract and the purified extract plus potassium oleate were each tested for gushing according to the following procedure:— Half pint bottles of carbonated beer (15) had sampling clips attached and the crown corks were pierced with a 1/6 inch spike through self sealing rubber septa. The hop extracts were dissolved in water to give solutions containing 600 mg. iso-humulone per 100ml.

Aliquots of these solutions (1 ml) were added to the beer using a hypodermic syringe piercing the rubber septum and passing through the hole in the crown cork and into the headspace of the bottle.

Three bottles were treated with the fatty acid augmented hop extract and six bottles with the purified extract. A further three bottles each had 1ml. of distilled water added. The bottles were shaken gently to achieve mixing.

All 12 bottles were stored overnight at 2°C and subsequently allowed to come back to room temperature. Three bottles which had been treated with the purified resin were treated with 1 ml. of a solution containing 60mg. potassium oleate in 100 ml. water.

In turn each of the bottles was inverted 15 times during 20 seconds, and after standing for 30 seconds the crown cork was quickly removed using the sampling clip. A subjective assessment of the 'gushing' behaviour of the beer was then made.

| | | |
|---|---|---|
| 1. | Blank (Distilled Water) | Very slight gushing |
| 2. | Purified extract | Severe gushing |
| 3. | Purified extract with Potassium Oleate | No gushing |
| 4. | Purified extract with subsequent addition of Potassium Oleate to beer | No gushing |

Our invention includes methods of making hop extracts by the steps:

1. Extracting hops with any convenient organic solvent such as has heretofore been used for the purpose;
2. Isomerising the α-acids, for example with aqueous alkali such as aqueous sodium or potassium hydroxide or carbonate or lime or baryta water;
3. Before or after the isomerisation step, separating the α-acids or iso-α-acids respectively as part of an α-acid or iso-α-acid rich fraction, for example by extraction from a water immiscible solvent such as petroleum into aqueous alkali, or by precipitation with a suitable cation; and
4. Mixing the separated α-acid or iso-α-acid rich fraction or an iso-α-acid rich fraction obtained by isomerising an α-acid rich fraction with an unsaturated fatty acid having from 6 to 25 carbon atoms in a proportion of from 1 to 20% based on the weight of α-acids or iso-α-acids in the fraction and preferably sufficient to raise the total unsaturated fatty acid content of the fraction to from 5 to 15 percent by weight of the α-acids or iso-α-acids.

The steps 1, 2 and 3 may be performed in accordance with any of the methods heretofore proposed for the preparation of hop extracts including, for example, and not by way of limitation, the methods proposed in British Pat. No. 1,161,787, Australian application 31952/71, U.S. Pat. No. 3,364,265, U.S. Pat. No. 3,433,642, Canadian Pat. No. 619,563 and British Pat. No. 1,058,976.

We claim:

1. A method for reducing the tendency of beer to gush which comprises admixing with said beer an unsaturated fatty acid having from 10-20 carbon atoms in a proportion of from 1-20 percent based on the weight of iso-α-acids in the finished beer.

2. A method according to claim 1 wherein the unsaturated acids have from 1-3 ethylenic bonds; and wherein the unsaturated fatty acids are added to the beer as part of an isomerised hop extract.

3. A method according to claim 2 wherein the unsaturated acid is oleic acid.

4. Either according to claim 2 wherein the unsaturated acid is linoleic or linolenic acid.

5. A method according to claim 2 wherein the unsaturated acid is added to the beer as an aqueous solution of its alkali metal salts.

6. A method according to claim 1 which comprises determining or estimating the proportion of fatty acid already present in the beer and subsequently adding thereto sufficient of the unsaturated fatty acid to raise the total unsaturated fatty acid content of the beer to a value of from 5–15 percent based on the weight of iso-α-acids in the finished beer.

7. The method of claim 2 wherein said unsaturated fatty acid is in an amount of from 5 to 15 percent based on the weight of said iso-α-acids.

8. The method of claim 7 wherein said unsaturated fatty acids are selected from the group consisting of oleic, linoleic, and linolenic acids.

9. A method for preparing an iso-α-acid rich hop fraction for use in the bittering of beer which may be prone to gushing which comprises:
   a. extracting hops with an organic solvent to form an α-acid containing crude extract
   b. isomerising the extracted α-acids
   c. separating the iso-α-acids from the isomerised extract as part of an iso-α-acid rich fraction containing less than 5 percent by weight of unsaturated fatty acids based on the weight of iso-α-acids,
   d. mixing said iso-α-acid rich fraction obtained according to step (c) with an unsaturated fatty acid having from 10–20 carbon atoms in a proportion of from 1–20 percent based on the weight of iso-α-acids in said fraction.

10. A method for preparing an iso-α-acid rich hop fraction for use in the bittering of beer which may be prone to gushing which comprises:
   a. extracting hops with an organic solvent to form an α-acid containing crude extract
   b. separating the α-acids from the extract as part of an α-acid rich fraction containing less than 5 percent by weight of unsaturated fatty acids based on the weight of α-acids
   c. isomerising said α-acid rich fraction,
   d. mixing said iso-α-acid rich fraction obtained by isomerising said α-acid rich fraction with an unsaturated fatty acid having from 10–20 carbon atoms in a proportion of from 1–20 percent based on the weight of iso-α-acids in said fraction.

* * * * *